United States Patent [19]

Dobashi et al.

[11] Patent Number: 5,643,676
[45] Date of Patent: Jul. 1, 1997

[54] COATING PROTECTIVE FILM

[75] Inventors: Akihiko Dobashi; Hirotugu Himori; Osamu Yamamoto, all of Shimodate; Kazuya Shiotsuki, Neyagawa; Muneaki Tomiyama, Hiroshima, all of Japan

[73] Assignees: Hitachi Chemical Company, Ltd., Tokyo; Nippon Paint Company, Ltd., Osaka, both of Japan

[21] Appl. No.: 450,152

[22] Filed: May 26, 1995

[30] Foreign Application Priority Data

May 30, 1994 [JP] Japan ................................. 6-116798
Nov. 17, 1994 [JP] Japan ................................. 6-283289

[51] Int. Cl.$^6$ ....................................... B32B 9/00
[52] U.S. Cl. ................... 428/411.1; 428/423.7; 428/424.2; 428/908.8; 428/343
[58] Field of Search ................ 428/212, 31, 213, 428/216, 328, 336, 354, 423.3, 423.7, 424.2, 908.8, 411.1, 343

[56] References Cited

U.S. PATENT DOCUMENTS 5,034,269  7/1991  Wheeler ............................ 428/354

FOREIGN PATENT DOCUMENTS

| 50-14667 | 5/1975 | Japan . |
| 50-52141 | 5/1975 | Japan . |
| 205470 | 12/1982 | Japan . |
| 57-205470 | 12/1982 | Japan . |
| 59-43084 | 3/1984 | Japan . |
| 63-186793 | 8/1988 | Japan . |
| 2-300281 | 12/1990 | Japan . |
| 3-221169 | 9/1991 | Japan . |
| 4-106175 | 4/1992 | Japan . |
| 4-153287 | 5/1992 | Japan . |
| 4153287 | 5/1992 | Japan . |
| 5-148460 | 6/1993 | Japan . |
| 6-73352 | 3/1994 | Japan . |
| 6-271821 | 9/1994 | Japan . |

Primary Examiner—Patrick Ryan
Assistant Examiner—Patrick Jewik
Attorney, Agent, or Firm—Antonelli, Terry, Stout & Kraus, LLP

[57] ABSTRACT

A coating protective film which comprises a substrate, which is made of a colored polyolefin film and has a maximum percent transmission of ultraviolet within a wavelength range of 190 to 370 nm of not more than 10%, and a pressure sensitive adhesive layer, which is made of a pressure sensitive adhesive containing as the main component at least one of polyisobutylene, butyl rubber and polybutene, satisfies the requirements for weatherability of protective pressure sensitive adhesive film which is temporarily attached to finished automobiles for the purposes of protection of automotive coating during transfer and storage, and is also so excellent in peelability as not to pollute the coating on the automobiles.

13 Claims, No Drawings

COATING PROTECTIVE FILM

BACKGROUND OF THE INVENTION (a) Field of the Invention

The present invention relates to coating protective film which is used temporarily to protect automotive coating, for example on the automotive body, during transportation and storage of automobiles.

(b) Description of the Related Art

Recently, there has arisen the problem that the value of finished automobiles as merchandize is impaired during transportation or keeping due to damage to coating on automotive body caused by spattered stones, a cloud of sand, dust, iron powder, dropping of birds, acidic rain, gas, etc., or due to deterioration of appearance, such as change of gloss or discoloration. In particular, export automobiles, which require a long-term transportation or storage, have been sustained such damage. To protect the automotive coating from such damage, oil- or water-wax type coating protective agents consisting mainly of paraffins have been applied on the surface of the coating.

The wax type-coating protective agents however are not enough efficacious against iron powder, dropping of birds, acidic rain, or the like, and also have bad effects due to migration into the coating. Further, such agents become difficult to remove after standing outdoors for more than about three months, and the waste liquor generated during removal thereof using solvents causes public hazard or requires troublesome treatments. As disclosed in Japanese Patent Application Kokai Koho (Laid-open) Nos. 2-300281 and 3-221169, it is proposed as an alternative to protect the automotive coating by attaching pressure sensitive adhesive film on the surface of automotive body.

A fundamental property requisite to protective film for automotive coating is that it deteriorates so little during a long-term outdoor exposure as not to pollute the coating, for example, by adhesive transfer. The pressure sensitive films disclosed in the above two official gazettes, however, are insufficient in weatherability to tolerate a long-term outdoor use because the substrates thereof are transparent polyolefin films which have been used for painted steel plates. Further, when being attached on automotive body and exposed outdoors for a long term, such films tend to deteriorate so that pressure sensitive adhesives cannot be peeled together with the substrate from the surface of the automotive body and the remaining pressure sensitive adhesives pollute the automotive coating. In these official gazettes, acrylic pressure sensitive adhesives and polyisobutylene pressure sensitive adhesives are exemplified as the typical examples of the pressure sensitive adhesives. As to acrylic pressure sensitive adhesives, the adhesion strength thereof changes widely with passage of time and increases on a long-term outdoor use, thereby making peeling difficult. Polyisobutylene pressure sensitive adhesives, whose adhesion strength changes little with passage of time, have good peelability, but are disadvantageous in that when used outdoors for a long time, these adhesives are decreased in cohesive power due to the poor weatherability of adhesiveness and are apt to remain on automotive coating.

Further, some automotive coating has low glass transition temperature and is easily deformed even by a very low pressure depending on temperature. Therefore, in case the pressure sensitive adhesive films disclosed in the above official gazettes or those conventionally used for the surface protection of aluminum, stainless steel or painted steel sheet-piles are used to protect automotive coating, these films easily deteriorate depending on the attaching temperature or the term of use, so that the change of surface roughness changes gloss or the print of the films are left due to the stress applied by bubbles or due to the deformation of the film edges. Further, automotive coating contains various additives for improving coating properties. The additives tend to migrate from the coating into the pressure sensitive adhesive layer and form, between the coating and the film, bubbles which are sensitive to stress and leave prints on the coating. Thus the appearance of the coating is severely deteriorated. The resins and additives in automotive coating vary according to the kind of the automotive coating, and polyisobutylene pressure sensitive adhesives need improvement since the adhesion strength thereof changes widely because of their susceptibility to the change of surface polarity and to bleeding additives.

SUMMARY OF THE INVENTION

The present invention has been made in view of the above-described situation, and the object of the present invention is to provide a coating protective film which does not pollute or deteriorate the appearance of coating, such as automotive coating, and effectively protects automotive coating from spattered stones, a cloud of sand, dust, iron powder, dropping of birds, acidic rain, gas, etc.

The present invention provides a protective film for automotive coating [hereinafter, it will sometimes be called coating protective film (1)], comprising a substrate and a pressure sensitive adhesive layer on the substrate, the substrate being made of a colored polyolefin film whose maximum percent transmission of ultraviolet within a wavelength range of 190 to 370 nm is not more than 10%, the pressure sensitive adhesive layer being made of a pressure sensitive adhesive which comprises 100 parts by weight of a polymer having a number average molecular weight of not more than 150,000 and being selected from the group consisting of polyisobutylene, butyl rubber and polybutene as a main component, 0.1 to 10 parts by weight of a release agent, 1 to 30 parts by weight of a tackifier and 0.1 to 10 parts by weight of at least one additive for automotive paint.

The present invention further provides a coating protective film [hereinafter, it will sometimes be called coating protective film (2)], comprising a substrate and a pressure sensitive adhesive layer on the substrate, the substrate being made of a colored polyolefin film which comprises a resin component comprising 5 to 40% by weight of ethylene units and 60 to 95% by weight of propylene units and whose maximum percent transmission of ultraviolet within a wavelength range of 190 to 370 nm is not more than 5%, the pressure sensitive adhesive layer comprising as a main component a polymer selected from the group consisting of polyisobutylene, butyl rubber and polybutene.

DESCRIPTION OF THE PREFERRED EMBODIMENTS

Protective film for automotive coating [coating protective film (1)]

The substrate of the protective film for automotive coating [coating protective film (1)] of the present invention is a colored polyolefin film whose maximum percent permission of ultraviolet within a wavelength of 190 to 370 nm is not more than 10%, and the film preferably contains 0.1 to 5 parts by weight of an additive for automotive paint per 100 parts by weight of the polyolefin. The substrate is preferably colored to white of not lower than N7 of the Munsell color system. It is also preferable in the present invention that the release agent is a silicone and that the additive for automotive paint is at least one selected from the group consisting of a sagging prevention agent (an agent for preventing paint from sagging), a surface active agent, a levelling agent, an agent for improving weatherability and a rheology controlling agent.

The substrate to be used in the present invention is a polyolefin film. Some examples of the polyolefin include a homopolymer of an α-olefin, such as ethylene, propylene or butene, a copolymer of two or more α-olefins, and a copolymer of one or more α-olefins with another monomer, such as vinyl acetate or methyl methacrylate. Polyolefin film is excellent in weatherability and heat resistance, and these properties may further be improved in processability or operation efficiency by adding additives, such as an antioxidant, an ultraviolet absorber, a lubricant or a plasticizer. The particularly preferred polyolefin film is polypropylene film since it resists to temperature higher than the temperature to which it will be exposed.

The coloration of the polyolefin film constructing the substrate may be performed by conventional addition of a pigment, or by printing on the back of the substrate (the surface bearing no pressure sensitive adhesive layer). The pigment to be added or the ink to be printed requires weatherability in view of the object of the present invention and is preferably inorganic one, which has good weatherability. To improve the polyolefin film constructing the substrate and the pressure sensitive adhesive in weatherability, the polyolefin film should be colored to such a degree that the polyolefin film has a maximum percent transmission of ultraviolet within a wavelength range of 190 to 370 nm of not more than 10%, preferably not more than 5%, more preferably not more than 1%. In the present invention, the polyolefin film constructing the substrate preferably contains at least one additive for automotive paint in a total amount of 0.1 to 5 parts by weight, more preferably 0.5 to 3 parts by weight, per 100 parts by weight of polyolefin resin.

The color of the substrate made of the polyolefin film may be selected considering cost, processability and the properties of the substrate, and is preferably white of N7 or higher, more preferably N8 or higher, of Munsell color system. According to the Munsell color system, achromatic color is designated by a symbol N and brightness, and the degree of brightness is arranged by dividing the range of brightness between 0 indicating ideal black and 10 indicating ideal white so that achromatic colors are arranged at equal intervals of difference in the sense of brightness.

Coloring to black by adding carbon black or the like, even in a small amount, effectively cuts off light to decrease the percent permission of ultraviolet to 10% or lower, but is not desirable since it causes a large increase of temperature due to absorption of light, so that the coating protective film may be heated to a high temperature of 80° C. or higher by direct sun light in summer to have adverse effects, such as thermal deformation, on some coating. On the other hand, coloring to white of N7 or higher in the Munsell color system is desirable since it controls the increased temperature to 50° to 60° C. However, in case coloring to white of N7 or higher in the Munsell color system is performed by addition of white pigment alone, the substrate itself may be insufficient in weatherability, and it is desirable to add an agent for improving weatherability.

Some examples of the white pigment that may be suitably used in the present invention include titanium oxides, such as titanium dioxide, calcium carbonate, barium sulfate and zinc oxide.

The agent for improving weatherability that may be used in the present invention is, for example, an age resistor or antioxidant, such as one of amine type, quinoline type, hydroquinone type, phenol type or phosphorous ester type, a light stabilizer, such as a salicylic acid derivative, a benzophenone UV absorber, a benzotriazole UV absorber or a hindered-amine light stabilizer. The total amount of the agent for improving weatherability is 0.1 to 5 parts by weight, preferably 0.5 to 3 parts by weight, per 100 parts by weight of the polyolefin. If it is added in an amount of less than 0.1 parts by weight, effects of addition cannot be expected, and if more than 5 parts by weight, it may migrate into the pressure sensitive adhesive to adversely affect the pressure sensitive adhesive.

The coating protective film (1) of the present invention may be produced by applying a pressure sensitive adhesive on one side of the polyolefin film to form a pressure sensitive adhesive layer. The pressure sensitive adhesive to be used in the present invention comprises as a main component a polymer which comprises at least one selected from the group consisting of polyisobutylene, butyl rubber and polybutene and has a number average molecular weight of 150,000 or less, preferably 50,000 to 150,000. Polyisobutylene is a polymer of isobutylene, and butyl rubber comprises as a main component a copolymer of isobutylene and isoprene. The butyl rubber to be used in the present invention may also be chlorinated one or one which is further copolymerized with other monomers having cross-linking functional groups, such as carboxyl groups or hydroxyl groups. Polybutene is a copolymer of isobutylene, which is a main component, with other structural isomers, such as 1-butene and n-butene. These polyisobutylene, butyl rubber and polybutene may be used individually or in combination of two or more, and in the later case, the mixture should have a number average molecule weight of 150,000 or less. Such a polymer having a relatively low molecular weight relieves largely the stress in the pressure sensitive adhesive. If the number average molecular weight is more than 150,000, the coating protective film tends to leave prints on automotive coating.

Some examples of the release agent to be used as the second component of the pressure sensitive adhesive include vegetable oil, aliphatic soap, silicone, fluorocarbon resin and compounds containing long chain alkyl groups, such as wax and alkyl carbamates, and silicone is particularly preferable because it effectively prevents the coating protective film from leaving prints and remarkably inhibits the adhesion strength of the pressure sensitive adhesive from increasing with passage of time. The silicone which may be used has skeletal siloxane bonds represented by (Si—O—Si) and may have various molecular weights and also may be modified one. Some examples include strait silicone oils, such as dimethylsilicone oil and methylphenylsilicone oil, and modified silicone oils, such as copolymers of these silicone oils with polyoxyalkylenes and amino-modified silicone. The release agent is added in an amount of 0.1 to 10 parts by weight, preferably 0.5 to 5 parts by weight, per 100 parts by weight of the polymer that is the main component of the pressure sensitive adhesive. If the release agent is added in an amount of less than 0.1 parts by weight, it cannot have substantial effects, and if more than 10 parts by weight, the adhesion strength will be decreased excessively.

The tackifier to be used in the present invention as the third component is preferably a terpene resin tackifier or a terpene-phenol resin tackifier. Some examples of the tackifier include terpene resin which is a polymerization product of a terpene, such as α-pinene, β-pinene or dipentene, a terpene-phenol resin which is a copolymerization product of a terpene as a main monomer with a phenol, such as phenol or bisphenol, and modified ones, for example, ones modified by hydrogenation. The tackifier compensates for the decrease in adhesion strength due to the presence of the release agent or the additive for automotive coating, to provide appropriate adhesion strength.

The amount of the tackifier is 1 to 30 parts by weight, preferably 1 to 10 parts by weight, more preferably 3 to 8 parts by weight, per 100 parts by weight of the polymer which is the main component of the pressure sensitive adhesive. If the tackifier is added in an amount of less than 1 parts by weight, it cannot have substantial effects, and if more than 30 parts by weight, it will undesirably cause blooming of adherends, adhesive transfer on adherends and a decrease in weatherability.

The additive for automotive paint to be used in the present invention as the fourth component is preferably an additive contained in the paint of the automotive coating to which the coating protective film (1) will be attached. Some examples of the additive for automotive paint include a sagging prevention agent, a surface active agent, a levelling agent, an agent for improving weatherability, a rheology controlling agent, a mildew-proofing agent, an antiseptic agent and an electrostatic finishing assistant, and at least one of those is used. It is preferable to use at least one selected from a sagging prevention agent, a surface active agent, a levelling agent, an agent for improving weatherability and a rheology controlling agent. Some additives for automotive paint have plural effects. The Mount of the additive for automotive paint is 0.1 to 10 parts by weight, preferably 0.3 to 8 parts by weight, more preferably 0.3 to 5 parts by weight, per 100 parts by weight of the polymer that is the main component of the pressure sensitive adhesive. If it is added in an amount of less than 0.1 parts by weight, it cannot have substantial effects, and if more than 10 parts by weight, it may migrate into and deteriorate automotive coating, or may transfer on and pollute the surface of the coating after the coating protective film is removed. In case plural additives for automotive paint are added, each of those is added preferably in an amount of 0.1 part by weight or more per 100 parts by weight of the polymer that is the main component of the pressure sensitive adhesive.

The sagging preventive agent which may be used in the present invention as an additive for automotive paint is an additive which is generally added to paint to prevent the paint from running down on nearly vertically standing painting subject. The rheology controlling agent is an additive for controlling the flowability or viscosity of paint. These are used to control the viscosity of paint or to impart it with structural viscosity, to prevent the paint from sagging. Among sagging preventive agents and rheology controlling agents, some have both the effects of the formers and the latters. Some examples of these include carboxymethyl cellulose, sodium alginate, colloidal silica, organic bentonite and aluminum stearate.

The agent for improving weatherability is added to improve weatherability, and typical examples include antioxidants and light stabilizers, such as UV absorbers. Among these, antioxidants are additives for preventing oxidation degradation, and are also called age resistors or antiozonants. Antioxidants are classified roughly into radical chain reaction inhibitors, which prevent the radicals generated by light or thermal energy from undergoing subsequent chain reaction, and agents for decomposing peroxides, which decompose the peroxides generated in the course of oxidation and change them into stable compounds. The typical examples of the former include aromatic amine compounds, hydroquinone compounds, quinoline compounds and phenol compounds, and the typical examples of the latter include sulfur compounds and phosphorus compounds. As to the more concrete examples of antioxidants, an example of the aromatic amine compounds is N,N-di-2-naphthyl-p-phenylenediamine, an example of the hydroquinone compounds is 2,5-di-(t-amyl)hydroquinone, the examples of the quinoline compounds are trimethyldihydroquinoline polymer and 6-ethoxy-2,2,4-trimethyl-1,2-dihydroquinoline, the examples of phenol compounds are 2,6-di-t-butyl-p-cresol, 2,2'-methylene-bis(4-methyl-6-t-butylphenol), 4,4'-butylidene-bis(3-methyl-6-t-butylphenol), 4,4'-thio-bis(3-methyl-6-t-butylphenol), stearyl-β-(3,5-di-t-butyl-4-hydroxyphenyl)propionate, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene and 1,1,3-tris(2-methyl-4-hydroxy-5-t-butylphenol)butane, the examples of sulfur compounds are dilauryl thiodipropionate, distearyl thiodipropionate, lauryl stearyl thiodipropionate and dimyristyl thiodipropionate, the examples of the phosphorous compounds are phosphorous ester antioxidants, such as triisodecyl phosphite, diphenyl isodecyl phosphite, triphenyl phosphite and trinonyl phosphite, and metal deactivators, such as N-salicyloyl-N'-aldehydehydrazine, N-salicyloyl-N'-acetylhydrazone, N,N'-diphenyloxamide and N,N'-di-(2-hydroxyphenyl)oxamide, also may be used.

As to light stabilizers, for example, hindered-amine light stabilizers and various UV absorbers may be used.

UV absorbers are added for the prevention of deterioration due to ultraviolet, and salicylic acid derivatives, benzophenone UV absorbers and benzotriazole UV absorbers are suitably used in the present invention. As to the examples of UV absorbers, some examples of the salicylic acid derivatives include phenyl salicylate, p-t-butylphenyl salicylate and p-octylphenyl salicylate, some examples of the benzophenone UV absorbers include 2-hydroxy-4-methoxybenzophenone, 2-hydroxy-4-n-octoxybenzophenone and 4-dodecyloxy-2-hydroxybenzophenone, and some examples of the benzotriazole UV absorbers include 2-(2'-hydroxy-5'-methylphenyl)benzotriazole, 2-(2'-hydroxy-3'-t-butyl-5'-methylphenyl)-5-chlorobenzotriazole and 2-(2'-hydroxy-4'-n-octoxyphenyl)benzotriazole.

Surface active agents contain hydrophilic groups and lipophilic groups in appropriate ratios and include anionic, cationic, nonionic and amphoteric surface active agents. The object of using these agents is to utilize the effectiveness thereof in cleaning, permeation, dispersing, coagulation, emulsification, demulsifying, solubilization, foaming, defoaming, lubrication, softening, electrification prevention, water repellency, sterilization and rust prevention.

Levelling agents are additives for levelling coating surfaces and decrease the surface tension of paint to prevent orange-peel or the like, which is also influenced by the resins in the coating or by the boiling points of solvents. In the present invention, a surface active agent, such as a silicone surface active agent or a fluorine surface active agent, may be used as a levelling agent.

The pressure sensitive adhesive to be used in the present invention may of course contain other general additives, such as colorants, in addition to the above-described the first to fourth components.

A substrate containing additives for automotive paint may be formed by blending and melt kneading a polyolefin resin with the additives for automotive paint in an extruder and then extruding the mixture through a T-die into film. In case the substrate is colored by printing, additives for automotive paint may also be added to printing ink.

The coating protective film (1) is produced by applying the pressure sensitive adhesive prepared by blending the above-described components on one side of the film (1) to form a pressure sensitive adhesive layer, whereby the coating protective film (1) adheres to the surface of automotive body and protect the automotive coating from stones, a cloud of sand, dust, iron powder, dropping of birds, gas, acidic rain, etc.

The coating protective film (1) of the present invention is not particularly limited in the thicknesses of the substrate and pressure sensitive adhesive layer, but it is generally preferable that the substrate is 10 to 100 μm thick and the pressure sensitive adhesive layer is 1 to 30 μm thick.

The thus produced coating protective film (1) has excellent weatherability because its substrate is made of the above-described, colored polyolefin film whose maximum percent permission of ultraviolet within a wavelength range of 190 to 370 nm is 10% or less. Further, since the main component of the adhesive that is polyisobutylene, butyl rubber or polybutene and has a number average molecular weight of not more than 150,000 releases effectively the stress in the pressure sensitive adhesive, and the release agent added as the second component bleeds out between the pressure sensitive adhesive layer and automotive coating to lubricate moderately the interface between the pressure sensitive layer and the automotive coating, the stress applied to the automotive coating by the deformation of the coating protective film (1) on and after its attachment can be decreased.

Further, the additive for automotive coating added as the fourth component in the pressure sensitive adhesive prevents the additives for automotive paint contained in automotive coating from migrating into the pressure sensitive adhesive layer and deteriorating the automotive coating. The tackifier added as the third component in the pressure sensitive adhesive layer compensates for the decrease in adhesion strength due to the release agent or the additives for automotive paint, which are added, respectively, as the second and fourth components, to ensure proper adhesion strength.

From the production to and during the use of the coating protective film (1), the additives for automotive paint added in the substrate prevents the additives for automotive paint added in the pressure sensitive adhesive layer from migrating into the substrate, thereby preventing a decrease in the concentration of the additives for automotive paint in the pressure sensitive adhesive layer. If the concentration of the additives for automotive paint in the pressure sensitive adhesive layer decreases, among the additives for automotive paint contained in automotive coating, some additives which tend to migrate may migrate from the automotive coating into the pressure sensitive adhesive layer, and the automotive coating may be deteriorated. Also, some colorants for the substrate may deteriorate the weatherability of the substrate, as described above. By adding in the substrate an agent for improving weatherability as an additive for automotive paint, the deterioration due to such colorants can be prevented, and also the weatherability of the substrate can be improved.

Coating protective film (2)

In the coating protective film (2) of the present invention, the resin component of the polyolefin film constructing the substrate is a mixture of a propylene homopolymer and an ethylene homopolymer, a copolymer of propylene and ethylene, or a mixture of a copolymer of propylene and ethylene and at least one of a propylene homopolymer and an ethylene homopolymer, and it contains 5 to 40 % by weight, preferably 8 to 30% by weight of ethylene units. If the content of ethylene units is less than 5% by weight, freezing resistance will be lowered, and if it is more than 40% by weight, the film will be too soft.

For the purpose of modification, the resin component may further be copolymerized with other comonomers, for example, α-olefins, such as butene, vinyl acetate or methyl methacrylate. Also, additives, such as antioxidants, UV absorbers, lubricants or plasticizers, may be added to improve weatherability, heat resistance, processability and operation efficiency of the substrate.

The preferred color of the substrate is white of N7 or higher, more preferably N8 or higher, of the Munsell color system. Although a film colored with even a small amount of carbon black or the like effectively cuts off light to decrease the percent permission of ultraviolet to 5% or lower, it is heated easily to a high temperature due to absorption of light, for example, to 80° C. or higher by direct sun shine in summer to have adverse effects, such as thermal deformation, on coating of a low glass transition temperature. On the other hand, coloring to white of N7 or higher of the Mansell color system is desirable since it controls the increased temperature to 60° to 70° C. However, coloring to white cannot endow the substrate itself with sufficient weatherability due to the poor light-shielding properties of white pigments. In such a case, it is necessary to add agents for improving weatherability.

As described as to the coating protective film (1), some examples of the agents for improving weatherability include age resistors or antioxidants, such as those of amine antioxidants, quinoline antioxidants, hydroquinone antioxidants, phenol antioxidants and phosphorous ester antioxidants, and light stabilizers, for example, UV absorbers, such as salicylic acid derivatives, benzophenone UV absorbers and benzotriazole UV absorbers, and hindered-amine light stabilizers. Hindered-amine light stabilizers are particularly preferable because of good compatibility with the resin component and high effectiveness in improving weatherability. The amount of the agent for improving weatherability is 0.1 to 10 parts by weight, preferably 0.3 to 5 parts by weight, per 100 parts by weight of the resin component. If it is added in an amount of less than 0.1 parts by weight, effects cannot be expected, and if more than 10 parts by weight, it will have adverse effects due to its migration into the pressure sensitive adhesive layer.

The preferred examples of the white pigment include titanium oxides, such as titanium dioxide, calcium carbonate, barium sulfate and zinc oxide. The coloration of the polyolefin film constructing the substrate may be performed by the conventional addition of a pigment, or by printing on the back of the substrate (the surface bearing no pressure sensitive adhesive layer). To improve the weatherability of the film, the coloration is performed so that the film has a maximum percent transmission of ultraviolet within a wavelength range of 190 to 370 nm of not more than 5%, preferably not more than 1%.

As to the polymer to be used as the main component of the pressure sensitive adhesive, polyisobutylene is a polymer of isobutylene, and butyl rubber comprises as a main component a copolymer of isobutylene and isoprene. The butyl rubber may also be chlorinated one or one which is further copolymerized with other monomers having cross-linking functional groups, such as carboxyl groups or hydroxyl groups. Polybutene is a copolymer of isobutylene, which is a main component, with other structural isomers, such as 1-butene and n-butene. These polyisobutylene, butyl rubber and polybutene may be used individually or in combination of two or more. The polymer to be used as the main component is desirably a rubber having a number average molecular weight (Mn) of 150,000 to 600,000, preferably 200,000 to 400,000. If the number average molecular weight is less than 150,000, the pressure sensitive adhesive may be insufficient in cohesive strength and weatherability, and if it is more than 600,000, the adhesion strength may be decreased at low temperatures, or printing may tend to occur due to the presence of bubbles sensitive to stress or due to deformation of the edge of the coating protective film.

Although there are known various methods for measuring molecular weight, such as high speed liquid chromatography, the viscometric method, the ultracentrifugal method, the light scattering method, the membrane osmotic pressure method and the ebullioscopic method, herein the high speed liquid chromatography is employed since it is simple in operation and is in common use.

The pressure sensitive adhesive preferably contains a release agent. The examples of the release agent are the same as those exemplified relating to the coating protective film (1), and the above-described silicone resin is also suitable. The amount of the release agent is preferably 0.5 to 10 parts by weight, more preferably 1 to 5 parts by weight, per 100 parts by weight of the polymer component to be used as the main component. If it is used in an amount of less than 0.5 parts by weight, printing or an increase in adhesion strength may not be prevented sufficiently. If it is used in an amount of more than 10 parts by weight, a decrease in adhesion strength or adhesive transfer due to the release agent may become considerable.

Also the pressure sensitive adhesive preferably contains a tackifier. Some examples of the tackifier which may be used include rosin, rosin derivatives, terpene resin, terpene-phenol resin, dammar resin, copal, shellac, aliphatic, aromatic or allcyclic petroleum resins, phenolic resins, such as alkylphenolic resins, modified phenolic resins, xylene resins, and those modified, for example, by hydrogenation. Particularly, terpene-phenol resin is suitable because of its good compatibility with polyisobutylene and its moderate polarity. The amount of the tackifier is preferably 1 to 20 parts by weight, more preferably 3 to 10 parts by weight, per 100 parts by weight of the polymer to be used as the main component. If it is used in an amount of less than 1 parts by weight, it may not have effects of improving adhesion strength, and if more than 20 parts by weight, printing of the tackifier on automotive coating may become considerable, or adhesive transfer due to a decrease in the adherency of the pressure sensitive adhesive may occur.

It is also preferable to add an agent for improving weatherability to improve the weatherability of the pressure sensitive adhesive. The examples of the agent for improving weatherability are the same as those exemplified above, and benzotriazole UV absorbers are particularly preferable because of its good compatibility with the polymer to be used as the main component and its effectiveness in improving weatherability. The amount of the agent for improving weatherability is preferably 0.1 to 10 parts by weight, more preferably 0.5 to 5 parts by weight, per 100 parts by weight of the polymer to be used as the main component. If it is used in an amount of less than 0.1 parts by weight, effects cannot be expected, and if more than 10 parts by weight, it will have adverse effects due to its migration into automotive coating.

Although the coating protective film (2) of the present invention is not particularly limited in the thicknesses of the substrate and the pressure sensitive adhesive layer, the substrate is preferably 10 to 100 μm thick, and the pressure sensitive adhesive layer is preferably 1 to 30 μm thick.

The pressure sensitive adhesive to be used in the coating protective film (2) of the present invention may of course contain other general additives, such as softening agents or colorants, in addition to the above-described components.

The substrate of the coating protective film (2) of the present invention is a colored polyolefin film whose maximum percent transmission of ultraviolet within a wavelength range of 190 to 370 nm is 5% or less. The matrix resin of the substrate is made mainly from propylene and contains 5 to 40% by weight of ethylene units. Although the propylene component has poor sun resistance for reasons of its structure, the ethylene component compensates for light resistance. Although the ethylene component has relatively poor heat resistance, the propylene component, which is excellent in heat resistance, compensates for the deficiency and makes the film thermally resistive enough to stand use. This ensures high weatherability. The substrate colored to white of N7 or higher of the Munsell color system reflects light and controls the increase of temperature. Thus the stress that may set up in the coating by release of stress in the substrate and pressure sensitive adhesive due to high temperatures can be controlled. The stress applied to the coating causes troubles, such as printing of the traces of the coating protective film.

In case a substrate colored to white of N7 or higher of the Munsell color system is used, although the substrate reflects light to control temperature rise and lower the stress applied on coating so that it leaves no prints on the coating, white pigments generally shield only a little light, and harmful ultraviolet penetrates into the substrate and, according to circumstances, further into the pressure sensitive adhesive layer, to decompose the components therein. In particular, some colorants accelerate the photo-degradation of the substrate when used for whitening the substrate, requiring particular care on the use thereof. For example, titanium dioxide, which is a common white pigment, is known to form active compounds, such as $OH·(H_2O_2)$, via the sequential processes of the formation of $Ti(4+)·OH(-)$ with the water on its surface followed by the formation of electrons and positive holes with absorbed light, thereby accelerating the decomposition. The addition of an agent for improving weatherability, such as a hindered-amine light stabilizer, to the substrate inhibits such a bad effect and improves the weatherability. Hindered-amine light stabilizers act on these radicals and per acids particularly effectively, to improve stability. Further, among various stabilizers, hindered-amine light stabilizers are particularly suitable since these are excellent in compatibility with resins and do not migrate from the substrate into the pressure sensitive adhesive or the coating on adherends.

Although ultraviolet is absorbed almost completely in the substrate, some little ultraviolet penetrates into the pressure sensitive adhesive layer, which will be deteriorated by a long-term exposure to the penetrating ultraviolet. The deteriorated pressure sensitive adhesive causes adhesive transfer on adherends. Such a trouble may be solved by adding to the pressure sensitive adhesive an agent for improving weatherability, such as a light stabilizer, particularly a benzotriazole ultraviolet absorber, to further improve the weatherability and make the pressure sensitive adhesive tolerable to a long-term outdoor use.

Unlike acrylic pressure sensitive adhesives, the pressure sensitive adhesive used in the present invention contains as the main component at least one of polyisobutylene, butyl rubber and polybutene and, therefore, is free from an increase in adhesion strength with passage of time and from difficulty in peeling. In case the coating protective film needs an improved weatherability requisite for a long-term outdoor storage, the deficiency of these polymers in weatherability can be compensated by the UV absorption in the colored substrate and further by the addition of an agent for improving weatherability, such as a UV absorber, to the pressure sensitive adhesive. Therefore, when the coating protective film (2) of the present invention is removed after it was attached on the trunk, roof or bonnet of automobiles or the like, and protected outdoors for a long term the coating thereon from pollution and flaws, it shows good protection effects without lowering removing efficiency due to the deterioration of the film nor causing adhesive transfer or the change of the gloss of the coating.

Hereinafter, the present invention will be described in detail referring to the following Examples and Comparatives, but the feature of the present invention is not limited to the Examples. In the following description, the term "part" means "part by weight". In the following Examples and Comparative Examples, the maximum percent transmission of ultraviolet of each substrate was measured by using an ultraviolet-visible spectrophotometer UV-2200A produced by Shimazu Corp.

[Coating protective film (1)]

EXAMPLE (1)1

97 parts by weight of a polypropylene resin (trade name: AS171A, produced by Sumitomo Chemical Co., Ltd.), 3 parts by weight of titanium dioxide (trade name: TIPAQUE, produced by Ishihara Sangyo Kaisha, Ltd.) as a white colorant and 0.1 part by weight of a hindered-amine light stabilizer (trade name: MU41, produced by Sumitomo Chemical Co., Ltd.) were mixed, kneaded and extruded by a T-die technique, to form a polypropylene film of 40 μm thick. The film had a maximum percent transmission of ultraviolet within a wavelength range of 190 to 370 nm of not more than 1%, and was white of N9 of the Munsell color system. A coating protective film was produced by using the film as a substrate and coating it with a pressure sensitive adhesive having the composition as shown in Table 1, in the column of Example (1)1, to form a pressure sensitive adhesive layer of 5 μm thick.

EXAMPLES (1)2 AND (1)3

In each Examples, a coating protective film was produced in the same manner as in Example (1)1 except that a pressure sensitive adhesive having the composition as shown in Table 1, in the column of Example (1)2 or (1)3, was applied to form a layer of 5 μm thick.

COMPARATIVE EXAMPLES (1)1, (1)2 AND (1)3

In each Examples, a coating protective film was produced in the same manner as in Example (1)1 except that a pressure sensitive adhesive having the composition as shown in Table 1, in the column of Comparative Example (1)1, (1)2 or (1)3, was applied to form a layer of 5 μm thick.

TABLE 1

|  | Examples | | | Comparative Examples | | |
|---|---|---|---|---|---|---|
|  | (1)1 | (1)2 | (1)3 | (1)1 | (1)2 | (1)3 |
| Mn = 658,000 *1 | — | — | — | — | 100 | — |
| Mn = 120,000 *2 | 50 | 50 | 100 | 50 | — | — |
| Mn = 40,000 *3 | 50 | 50 | — | 50 | — | 100 |
| Release agent *4 | 3 | 3 | 3 | — | 3 | 3 |
| Tackifier *5 | 5 | 5 | 5 | — | 5 | — |
| Levelling agent *6 | 0.5 | 0.5 | 0.5 | 0.5 | 0.5 | 0.5 |
| Antioxidant *7 | 0.5 | — | — | — | — | — |

*1 Polyisobutylene: trade name: MML-140, produced by Tonex Co., Ltd.
*2 Polyisobutylene: trade name: OPPANOL B50, produced by BASF Japan
*3 Polyisobutylene: trade name: OPPANOL B10, produced by BASF Japan
*4 Silicone: trade name: KF96, produced by Shin-Etsu Chemical Co., Ltd.
*5 Terpene resin: trade name: YS RESIN PX1150, produced by Yasuhara Chemical Co., Ltd.
*6 2-Ethylhexyl acrylate homopolymer (molecular weight: 5,000): trade name: BYK-306, produced by BYK-CHEMIE GMBH
*7 Trade name: SUMILISER BHT, produced by Sumitomo Chemical Co., Ltd.

Each of the coating protective film produced in Examples (1)1 to (1)3 and Comparative Examples (1)1 to (1)3 was attached to the painted surfaces of painted steel panels A, B and C, and were examined for the initial adhesion strength and the effects on the coating.

The painted steel panels A, B and C were prepared as follows.

Dull steel panels that had been treated with zinc phosphate were painted by electrophoretic painting with a cationic electrodeposition paint (trade name: POWERTOP U-60, produced by Nippon Paint Co., Ltd.) to form a dry coating of about 25 μm thick.

The steel panels were further coated, on the coating formed by the electrophoretic painting, with a intermediate paint (trade name: ORGA P-2 SEALER, produced by Nippon Paint Co., Ltd.) by air spraying to form a dry coating of about 40 μm thick, which was then baked at 140° C. for 30 minutes, to obtain intermediately-painted plates.

The intermediately-coated steel panels were coated with the following paints, to obtain the painted steel panels A, B and C for testing.

As to the painted steel panels A and B, the intermediately-painted steel panels were coated by air spraying with a paint (trade name: SUPERLAC M-150 BLACK, produced by Nippon Paint Co., Ltd.) to form a dry coating of 18 μm thick. After setting for about 5 minutes, the following clear paints were further applied thereon to form a dry coating of 30 μm thick, were set for about 10 minutes, and were baked at 140° C. for 30 minutes, to obtain the painted steel panels A and B for testing.

Painted steel panels A:
SUPERLAC O-100 CLEAR (trade name), produced by Nippon Paint Co., Ltd.

Painted steel panels B:
ORGA TO-561 CLEAR (trade name), produced by Nippon Paint Co., Ltd.

As to the painted steel panels C, the intermediately-painted steel panels were coated by air spraying with a paint (trade name: ORGA TO-650 BRILLIANT BLACK PZ, produced by Nippon Paint Co., Ltd.) to form a dry coating of 30 μm thick, and after setting for about 10 minutes, baking was carried out at 140° C. for 30 minutes, to obtain the painted steel panels C for testing.

The compositions of SUPERLAC O-100 CLEAR, ORGA TO-561 CLEAR and ORGA TO-650 BRILLIANT BLACK PZ are listed in Table 2.

TABLE 2

|  | SUPERLAC O-100 CLEAR | ORGA TO-561 CLEAR | ORGA TO-650 BRILLIANT BLACK PZ |
| --- | --- | --- | --- |
| Acrylic resin | 70 | 70 | — |
| Polyester resin | — | — | 65 |
| Melamine resin | 30 | 30 | 35 |
| UV absorber *a | 2 | 2 | — |
| Light stabilizer *b | 1 | 1 | — |
| Levelling agent | | | |
| (1) *c | 0.2 | 0.2 | 0.5 |
| (2) *d | 0.1 | — | — |
| (3) *e | — | — | 0.5 |

*a Trade name: TINUBIN 900, produced by Ciba-Geigy AG
*b Trade name: TINUBIN 292, produced by Ciba-Geigy AG
*c 2-Ethylhexyl acrylate homopolymer (molecular weight: 5,000)
*d Trade name: KP 327, produced by Shin-Etsu Chemical Co., Ltd.
*e Acryl-polyester-amine copolymer (molecular weight: 5,000)

The measurement of initial adhesion strength was carried out under the conditions of peeling angle: 90°, peeling speed: 200 mm/min and atmospheric temperature: 20° C.-relative humidity: 65%. In the site of Yuki Works of Hitachi Chemical Co., Ltd., each of the painted steel panels A, B and C was subjected to the test for investigating effects on coating by allowing it to stand for three months from June to September, in 1993, in the open air on a bedestal for outdoor exposing test that had inclination of 45° to the south. The results are listed in Table 3, wherein excellent ones that were given no prints of bubbles nor prints of the borderlines between the exposed area and the area covered with the coating protective film are rated as 0, those on which such prints could be noticed only by specialists in painting are rated as Δ, and those on which such prints could be noticed clearly by anyone were rated as X.

TABLE 3

|  | Examples | | | Comp. Examples | | |
| --- | --- | --- | --- | --- | --- | --- |
|  | (1)1 | (1)2 | (1)3 | (1)1 | (1)2 | (1)3 |
| Initial adhesion strength (gf/25 mm) | 155 | 160 | 140 | 155 | 120 | 60 |
| Effects on coating | | | | | | |
| Coating on A | 0 | 0 | 0 | X | X | X |
| Coating on B | 0 | 0 | 0 | X | X | X |
| Coating on C | 0 | 0 | Δ | X | X | X |

As shown in Table 3, the coating protective films of Examples had high initial adhesion strength and little effects on coating, while the coating protective film of Comparative Example (1)1 had high initial adhesion strength but had considerably adverse effects on coating, and those of Comparative Example (1)2 and (1)3 had poor initial adhesion strength and considerably adverse effects on coating.

EXAMPLE (1)4

A coating protective film was produced in the same manner as in Example (1)1 with the exception that the polypropylene film used was colored to N8 of the Munsell color system and had a maximum percent permission of ultraviolet within a wavelength range of 190 to 370 nm of 1.0%.

COMPARATIVE EXAMPLE (1)4

A coating protective film was produced in the same manner as in Example (1)1 with the exception that the polypropylene film used was clouded to N5 of the Munsell color system and had a maximum percent permission of ultraviolet within a wavelength range of 190 to 370 nm of 2.5%.

COMPARATIVE EXAMPLE (1)5

A coating protective film was produced in the same manner as in Example (1)1 with the exception that the polypropylene film used was clouded to N2 of the Munsell color system and had a maximum percent permission of ultraviolet within a wavelength range of 190 to 370 nm of 30%.

Each of the coating protective films produced in Examples (1)1 and (1)4 and Comparative Examples (1)4 and (1)5 was applied on the painted surface of a steel panel which was painted with a black acrylic automotive paint (trade name: SUPERLAC M-150 BLACK), and was then examined for surface temperature and effects on coating. The results are listed in Table 4. The evaluation of the effects on coating was made in the same manner as in Examples (1)1 to (1)3.

TABLE 4

|  | Examples | | Comparative Examples | |
| --- | --- | --- | --- | --- |
|  | (1)1 | (1)4 | (1)4 | (1)5 |
| Surface temperature (°C.) | 55 | 60 | 75 | 85 |
| Effects on coating | 0 | 0 | X | X |

As shown in Table 4, the coating protective films of Comparative Examples (1)4 and (1)5 caused remarkable increase in surface temperature and considerably influenced the coatings, while those of Examples (1)1 and (1)4 colored to white of N7 or higher of the Munsell color system did not have such bad influences.

EXAMPLES (1)5, (1)6 AND (1)7

3 parts by weight of titanium dioxide (trade name: TIPAQUE, produced by Ishihara Sangyo Kaisha, Ltd.) was added to 97 parts by weight of a polypropylene resin (trade name: AS171A, produced by Sumitomo Chemical Co, Ltd.) to prepare a base material, which was then kneaded together with the additives for automotive paint as listed in Table 5, and was then extruded by a T-die technique, to form a polypropylene film of 40 μm thick. The film had a maximum percent permission of ultraviolet within a wavelength range of 190 to 370 nm of 1% or less and was white of N9 of the Munsell color system. A coating protective film was produced by using the film as a substrate and coating it with a pressure sensitive adhesive having the composition as shown in Table 5, to form a layer of 5 μm thick.

Each of the coating protective films produced in Examples (1)5 to (1)7 was attached to the three kinds of painted steel panels A, B and C that were painted with acrylic black paint, and was then examined for initial adhesion strength and, after outdoor exposure tests (three months from June to September, six months from June to November), for its effects on coating. The results are listed in Table 5. The evaluations of initial strength and effects on coating were carried out in the same manner as in Examples (1)1 to (1)3.

TABLE 5

| | Examples | | |
|---|---|---|---|
| | (1)5 | (1)6 | (1)7 |
| Substrate | | | |
| Polypropylene *8 | 97 | 97 | 97 |
| Titanium dioxide *9 | 3 | 3 | 3 |
| Agent for improving weatherability (Hindered-amine light stabilizer) *10 | 0.1 | 0.1 | 0.1 |
| Levelling agent *6 | 0.5 | 0.5 | 0.5 |
| Antioxidant *7 | 0.5 | — | — |
| Rheology controlling agent *11 | 0.5 | 0.5 | — |
| Pressure sensitive adhesive | | | |
| Polyisobutylene *2 | 100 | 100 | 100 |
| Release agent *4 | 3 | 3 | 3 |
| Tackifier *5 | 5 | 5 | 5 |
| Agent for improving weatherability (Hindered-amine light stabilizer) *12 | 0.1 | 0.1 | 0.1 |
| Initial adhesion strength (gf/25 mm) | 145 | 165 | 140 |
| Effects on coating Three-months outdoor exposure | | | |
| Coating on A | 0 | 0 | ○ |
| Coating on B | 0 | 0 | ○ |
| Coating on C | 0 | 0 | ○ |
| Six-months outdoor exposure | | | |
| Coating on A | 0 | 0 | △ |
| Coating on B | 0 | 0 | ○ |
| Coating on C | 0 | △ | ○ |

*2 to *7 are the same as defined in Table 1.
*8 Trade name: AS171A, produced by Sumitomo Chemical Co., Ltd.
*9 Trade name: TIPAQUE, produced by Ishihara Sangyo Kaisha, Ltd.
*10 Hindered-amine light stabilizer, trade name: MU41, produced by Sumitomo Chemical Co., Ltd.
*11 Trade name: MICROGEL, produced by Souken Kagaku Kabushiki Kaisha
*12 Hindered-amine light stabilizer, trade name: TINUBIN 622LD, produced by Ciba-Geigy AG)

As mentioned above, the substrate used in the present invention has good weatherability since it is a colored polyolefin film having a maximum percent transmission of ultraviolet within a wavelength range of 190 to 370 nm or 10% or less. The substrate bears a pressure sensitive adhesive layer which contains as the main component 100 parts by weight of a polymer having a number average molecular weight of 150,000 or less and being selected from polyisobutylene, butyl rubber, polybutene and mixtures thereof, and further contains 0.1 to 10 parts by weight of a release agent, 1 to 30 parts by weight of a tackifier and 0.1 to 10 parts by weight of at least one additive for automotive paint. The polyisobutylene, butyl rubber or polybutene that is the main component of the pressure sensitive adhesive greatly decreases the stress in the pressure sensitive adhesive because of its relatively low molecular weight, and the release agent added as the second component bleeds out between the pressure sensitive adhesive layer and coating to lubricate moderately the interface between the pressure sensitive adhesive layer and coating, thereby decreasing the stress that may be applied to adherend coating by the deformation of the coating protective film during its attachment and use.

Further, the additives for automotive paint, which is added as the fourth component in the pressure sensitive adhesive and, optionally, in the substrate, prevent the automotive paint contained in the coating from migrating into the pressure sensitive adhesive layer to deteriorate the coating, and prevent the prints of bubbles remaining between the film and the coating, the prints of the creases made at the time of attachment or the prints of the film edges.

The tackifier added as the third component in the pressure sensitive adhesive ensures appropriate adhesion strength because it compensates for a decrease of adhesion strength which may be caused by the release agent and additive for automotive paint added as the second and fourth components, and, further, its use together with the other additive components have additive effects in inhibiting the adhesion strength of the pressure sensitive adhesive from increasing with passage of time.

[Coating Protective Film (2)]

EXAMPLE (2)1

A film of 40 μm thick, which is to be used as a substrate, was produced by kneading 100 parts of a polypropylene resin randomly copolymerized with 8% by weight of ethylene (produced by Sumitomo Chemical Co., Ltd.), 10 parts of titanium dioxide (trade name: TIPAQUE, produced by Ishihara Sangyo Kaisha, Ltd.) as a white colorant and 0.5 parts of a hindered-amine light stabilizer (trade name: TINUBIN 622LD, produced by Ciba-Geigy AG) and extruding the mixture by a T-die technique. The film had a maximum percent transmission of ultraviolet within a wavelength range of 190 to 370 nm of 1% or less and was white of N9 of the Munsell color system. A coating protective film was produced by using the film as a substrate and coating the substrate with a pressure sensitive adhesive comprising 100 parts of a polyisobutylene (trade name: MML-80, produced by Tonex Co., Ltd., number average molecular weight Mn=180,000) and 3 parts of a benzotriazole UV absorber (trade name: TINUBIN 327, produced by Ciba-Geigy AG) to form a solid layer of 10 μm thick. For the purpose of examination, the coating protective film was laminated on a steel panel painted with a black acrylic automotive paint. The composition and the results are listed in Table 6.

EXAMPLE (2)2

A film of 40 μm thick, which is to be used as a substrate, was produced by kneading 92 parts of a polypropylene resin (produced by Sumitomo Chemical Co., Ltd.), 8 parts of a polyethylene resin (produced by Sumitomo Chemical Co., Ltd.), 10 parts of titanium dioxide (trade name: TIPAQUE, produced by Ishihara Sangyo Kaisha, Ltd.) and 0.5 parts of a hindered-amine light stabilizer (trade name: TINUBIN 622LD, produced by Ciba-Geigy AG) and extruding the mixture by a T-die technique. The film had a maximum percent transmission of ultraviolet within a wavelength range of 190 to 370 nm of 1% or less and was white of N9 of the Munsell color system. A coating protective film was produced by using the film as a substrate and coating the substrate with a pressure sensitive adhesive comprising 100 parts of a polyisobutylene, which was a mixture of a polyisobutylene of Mn=300,000 (trade name: MML-120, produced by Tonex Co., Ltd.) and a polyisobutylene of Mn=40,000 (trade name: OPPANOL B-15, produced by BASF Japan) in a weight ratio of 70/30, and 3 parts of a benzotriazole UV absorber (trade name: TINUBIN 327, produced by Ciba-Geigy AG) to form a solid layer of 10 μm thick. For the purpose of examination, the coating protective film was laminated on a steel panel painted with a black acrylic automotive paint. The composition and results are listed in Table 6.

EXAMPLE (2)3

A film of 40 μm thick, which is to be used as a substrate, was produced by kneading 60 parts of a polypropylene resin (produced by Sumitomo Chemical Co., Ltd.), 40 parts of a polyethylene (produced by Sumitomo Chemical Co., Ltd.), 10 parts of titanium dioxide (trade name: TIPAQUE, produced by Ishihara Sangyo Kaisha, Ltd.) and 0.5 parts of a hindered-amine light stabilizer (trade name: TINUBIN 622LD, produced by Ciba-Geigy AG) and extruding the mixture by a T-die technique. The film had a maximum percent transmission of ultraviolet within a wavelength range of 190 to 370 nm of 1% or less and was white of N9 of the Munsell color system. A coating protective film was produced by using the film as a substrate and coating the substrate with a pressure sensitive adhesive comprising 100 parts of a polyisobutylene (trade name: MML-80, produced by Tonex Co., Ltd., number average molecular weight Mn=180,000) and 3 parts of a benzotriazole UV absorber (trade name: TINUBIN 327, produced by Ciba-Geigy AG) to form a solid layer of 10 μm thick. For the purpose of examination, the coating protective film was laminated on a steel panel painted with a black acrylic automotive paint. The composition and results are listed in Table 6.

EXAMPLE (2)4

A film of 40 μm thick, which is to be used as a substrate, was produced by kneading 100 parts of a polypropylene resin randomly copolymerized with 8% by weight of ethylene (produced by Sumitomo Chemical Co., ltd.), 10 parts of titanium dioxide (trade name: TIPAQUE, produced by Ishihara SanGyo Kaisha, Ltd.) and 0.5 parts of a hindered-amine light stabilizer (trade name: TINUBIN 622LD, produced by Ciba-GeiGy AG) and extruding the mixture by a T-die technique. The film had a maximum percent transmission of ultraviolet within a wavelength range of 190 to 370 nm of 1% or less and was white of N9 of the Munsell color system. A coating protective film was produced by using the film as a substrate and coating the substrate with a pressure sensitive adhesive comprising 100 parts of a polyisobutylene (trade name: OPPANOL B150, produced by BASF Japan, Mn=430,000) and 3 parts of a benzotriazole UV absorber (trade name: TINUBIN 327, produced by Ciba-Geigy AG) to form a solid layer of 10 μm thick. For the purpose of examination, the coating protective film was laminated on a steel panel painted with a black acrylic automotive paint. The composition and the results are listed in Table 6.

COMPARATIVE EXAMPLE (2)1

A film of 40 μm thick, which is to be used as a substrate, was produced by extruding a polypropylene resin alone by a T-die technique. The film had a maximum percent permission of ultraviolet within a wavelength range of 190 to 370 nm of 70% or more. A coating protective film was produced in the same manner as in Example (2)1 with the exception that the film made only of the polypropylene resin was used as a substrate. For the purpose of examination, the coating protective film was laminated on a steel panel painted with a black acrylic automotive paint. The composition and results are listed in Table 6.

COMPARATIVE EXAMPLE (2)2

A coating protective film was produced in the same manner as in Example (2)1 with the exception that an acrylic rubber (trade name: NISSETSU KP-1405, produced by Nippon Carbide Industries Co., Inc.) was used as a pressure sensitive adhesive. For the purpose of examination, the coating protective film was laminated on a steel panel painted with a black acrylic automotive paint. The composition and results are listed in Table 6.

COMPARATIVE EXAMPLE (2)3

A film of 40 μm thick, which is to be used as a substrate, was produced by kneading 50 parts of a polypropylene resin (produced by Sumitomo Chemical Co., Ltd.), 50 parts of a polyethylene resin (produced by Sumitomo Chemical Co., Ltd.), 10 parts of titanium dioxide (trade name: TIPAQUE, produced by Ishihara Sangyo Kaisha, Ltd.) and 0.5 parts of a hindered-amine light stabilizer (trade name: TINUBIN 622LD, produced by Ciba-Geigy AG) and extruding the mixture by a T-die technique. A coating protective film was produced by using the film as a substrate and coating the substrate with a pressure sensitive adhesive comprising 100 parts of a polyisobutylene (trade name: MML-80, produced by Tonex Co., Ltd., number average molecular weight Mn=180,000) and 3 parts of 2-hydroxy-4-n-octoxybenzophenone as a UV absorber to form a solid layer of 10 μm thick. For the purpose of examination, the coating protective film was laminated on a steel panel painted with a black acrylic automotive paint. The composition and results are listed in Table 6.

COMPARATIVE EXAMPLE (2)4

A film of 40 μm thick, which was to be used as a substrate, was produced by kneading 100 parts of a polypropylene resin (produced by Sumitomo Chemical Co., Ltd.), 10 parts of titanium dioxide (trade name: TIPAQUE, produced by Ishihara Sangyo Kaisha, Ltd.) and 0.5 parts of a hindered-amine light stabilizer (trade name: TINUBIN 622LD, produced by Ciba-Geigy AG) and extruding the mixture by a T-die technique. A coating protective film was produced by using the film as a substrate and coating the substrate with a pressure sensitive adhesive comprising 100 parts of a polyisobutylene (trade name: OPPANOL B246, produced by BASF Japan, Mn=760,000) and 3 parts of a benzotriazole UV absorber (trade name: TINUBIN, produced by Ciba-Geigy AG) to form a solid layer of 10 μm thick. For the purpose of examination, the coating protective film was laminated on a steel panel painted with a black acrylic automotive paint. The composition and results are listed in Table 6.

COMPARATIVE EXAMPLE (2)5

A film of 40 μm thick, which was to be used as a substrate, was produced by extruding 100 parts of a polypropylene resin randomly copolymerized with 8% by weight of ethylene (produced by Sumitomo Chemical Co., Ltd.) by a T-die technique. A coating protective film was produced by using the film as a substrate and coating the substrate with a pressure sensitive adhesive comprising 100 parts of a polyisobutylene (trade name: MML-80, produced by Tonex Co., Ltd., Mn=180,000) to form a solid layer of 10 μm thick. For the purpose of examination, the coating protective film was laminated on a steel panel painted with a black acrylic automotive paint. The composition and results are listed in Table 6.

TABLE 6

|  | Example Nos. | | | | Comparative Example Nos. | | | | |
| --- | --- | --- | --- | --- | --- | --- | --- | --- | --- |
|  | (2)1 | (2)2 | (2)3 | (2)4 | (2)1 | (2)2 | (2)3 | (2)4 | (2)5 |
| Substrate | | | | | | | | | |
| E-P Copolymer (*13) | 100 | — | — | 100 | — | 100 | — | — | 100 |
| Polypropylene resin | — | 92 | 60 | — | 100 | — | 50 | 100 | — |
| Polyethylene resin | — | 8 | 40 | — | — | — | 50 | — | — |
| Titanium dioxide | 10 | 10 | 10 | 10 | — | 10 | 10 | 10 | — |
| Hindered-amine light stabilizer (*14) | 0.5 | 0.5 | 0.5 | 0.5 | — | 0.5 | 0.5 | 0.5 | — |
| Pressure sensitive adhesive | | | | | | | | | |
| PIB Mn ≧ 760,000 (*15) | — | — | — | — | — | Acrylic rubber | — | 100 | — |
| PIB Mn = 430,000 (*16) | — | — | — | 100 | — | — | — | — | — |
| PIB Mn = 300,000 (*17) | — | 70 | — | — | — | — | — | — | — |
| PIB Mn = 180,000 (*18) | 100 | — | 100 | — | 100 | 100 | 100 | — | 100 |
| PIB Mn = 40,000 (*19) | — | 30 | — | — | — | — | — | — | — |
| UV absorber (*20) | 3.0 | 3.0 | 3.0 | 3.0 | 3.0 | 3.0 (*21) | 3.0 | 3.0 | — |
| Munsell color system | N9 | N9 | N9 | N9 | — | N9 | N9 | N9 | — |
| Max. percent transmission (190–370 nm) | 1%≧ | 1%≧ | 1%≧ | 1%≧ | ≧70% | 1%≧ | 1%≧ | 1%≧ | ≧50% |
| Initial adhesion strength (gf/25 mm) | | | | | | | | | |
| 25° C. | 155 | 160 | 150 | 130 | 150 | 200 | 150 | 80 | 155 |
| −25° C. | 80 | 90 | 85 | 70 | 80 | 130 | 80 | 30 | 80 |
| Adhesion strength (gf/25 mm) | 350 | 380 | 350 | 330 | 355 | >1000 | 360 | 300 | Note 1 |
| Weatherability and heat resistance | | | | | | | | | |
| Peeled surface | ○ | ○ | ○ | ○ | △ | X | X | X | Note 1 |
| Film | Good | Good | Good | Good | Deterioration | Good | Good | Good | Severe deterioration |
| Adhesion strength (gf/25 mm) | 350 | 380 | 350 | 320 | 360 | >1000 | 360 | 250 | 350 |
| Peeled surface | ○ | ○ | ○ | ○ | ○ | X | X | X | X |

(*13) Ethylene-propylene random copolymer resin containing 8% by weight of ethylene units
(*14) Trade name: TINUBIN 622LD, produced by Ciba-Geigy AG
(*15) Polyisobutylene, trade name: OPPANOL B246, produced by BASF Japan
(*16) Polyisobutylene, trade name: OPPANOL B150, produced by BASF Japan
(*17) Polyisobutylene, trade name: MML-120, produced by Tonex Co., Ltd
(*18) Polyisobutylene, trade name: MML-80, produced by Tonex Co., Ltd
(*19) Polyisobutylene, trade name: OPPANOL B15, produced by BASF Japan
(*20) Trade name: TINUBIN 327, produced by Ciba-Geigy AG.
(*21) Benzophenone UV absorber.

Initial adhesion strength: measuring conditions—peeling angle: 90°, peeling speed: 200 mm/min.

Weatherability test: By using a Sunshine Weather Meter produced by Suga Testing Machine Co., Ltd., each painted steel panel covered with a coating protective film was treated for 500 hours under the conditions of an atmospheric temperature of 43° C., 50% RH, a black panel temperature of 63° C. and raining of 12 min/hr, and then the coating protective film was peeled, to measure its adhesion strength and to evaluate the appearance of the surface of the painted steel panel and the state of the substrate film.

Heat resistance test: After each painted steel panel covered with a coating protective film was allowed to stand in a thermostat at 80° C. for 24 hours, the coating protective film was peeled to measure its adhesion strength and to evaluate the state of the surface of the painted steel panel.
Note 1:
Measurements could not be carried out because the substrate film was broken and could not be peeled.
Evaluation:

○: excellent ones that had no prints of bubbles or prints of the borderlines between the exposed area and the area covered with the coating protective film.

△: ones on which such prints could be noticed only by specialists in painting.

X: ones on which such prints could be noticed clearly by anyone.

As apparent from comparison between Examples and Comparative Examples, weatherability could be improved by using as the substrate the colored polyolefin film that was made mainly of propylene units and 5 to 40% by weight of ethylene units and had a percent transmission of ultraviolet within a wavelength range of 190 to 370 nm of not more than 5%.

Comparison between Example (2)1 and Comparative Example (2)5 in the state of film undergone the weatherability test shows the effectiveness of the light stabilizer added in the substrate, and among various ones which we have examined, hindered-amine light stabilizers were particularly effective. As to the UV absorbers added to the pressure sensitive adhesives, the particular effectiveness of a benzotriazole UV absorber was shown from comparison between Example (2)3 and Comparative Example (2)2.

EXAMPLE (2)5

A mixture of 92 parts of a polypropylene resin copolymerized with 8% by weight of ethylene (produced by Sumitomo Chemical Co., Ltd.), 8 parts of titanium dioxide (trade name: TIPAQUE, produced by Ishihara Sangyo Kaisha, Ltd.) and 0.1 parts of a hindered-amine light stabilizer (trade name: MU41, produced by Sumitomo Chemical Co., Ltd.) was extruded by a T-die technique, to form a film of 40 μm thick which was to be used as a substrate. The substrate had a maximum percent transmission of ultraviolet within a wavelength range of 190 to 370 nm of 1% or less and was colored to N9 of the Munsell color system. A coating protective film was produced by coating the film with a pressure sensitive adhesive comprising 100 parts of a polyisobutylene (trade name: OPPANOL B80, produced by BASF Japan, Mn=180,000), 3 parts of a benzotriazole UV absorber (trade name: TINUBIN 327, produced by Ciba-Geigy AG) as an agent for improving weatherability, 10 parts of a hydrogenated terpene-phenol resin tackifier (trade name: YS POLYSTER T115, produced by Yasuhara Chemical Co., Ltd.) and 2 parts of a silicone release agent (trade name: KF-96, produced by Shin-Etsu Chemical Co., Ltd.), to form a solid layer of 10 μm thick.

EXAMPLE (2)6

A mixture of 92 parts of a polypropylene resin (produced by Sumitomo Chemical Co., Ltd.), 8 parts of titanium dioxide (trade name: TIPAQUE, produced by Ishihara Sangyo Kaisha, Ltd.) and 0.1 parts of MU41 as an agent for improving weatherability was extruded by a T-die technique, to form a film of 40 μm thick which was to be used as a substrate. The substrate had a maximum percent transmission of ultraviolet within a wavelength range of 190 to 370 nm of 1% or less and was colored to N9 of the Munsell color system. The film was coated in the same manner as in Example (2)5 with the exception that the polyisobutylene in the pressure sensitive adhesive was replaced by a polyisobutylene mixture of OPPANOL B100 (produced by BASF Japan, Mn=250,000) and OPPANOL B15 (produced by BASF Japan, Mn=40,000) (weight ratio: 70:30), to obtain a coating protective film.

COMPARATIVE EXAMPLE (2)6

A coating protective film was produced in the same manner as in Example (2)5 with the exception that a film made only of a polypropylene resin (produced by Sumitomo Chemical Co., Ltd.) was used as the substrate.

COMPARATIVE EXAMPLE (2)7

A coating protective film was produced in the same manner as in Example (2)6 with the exception that OPPANOL B15 was used as the polyisobutylene.

COMPARATIVE EXAMPLES (2)8, (2)9 AND (2)10

Coating protective films were produced in the same manner as in Example (2)5 with the exception that no UV absorber was added (Comparative Example (2)8), or no tackifier was added (Comparative Example (2)9), or no silicone release agent was added (Comparative Example (2)10).

The coating protective films produced in the above-described Examples and Comparative Examples were attached to two kinds of steel panels painted with automotive paint, one being coated with an acrylic clear paint (coating D) and the other being coated with a hard polyester solid paint (coating E), and were then subjected to measurement of initial adhesion strength. The coating protective films attached to the coating D were further examined for the weatherability and heat resistance thereof. The adhesion strength was obtained as the load (gf) that was required to peel a coating protective film of 25 mm wide by pulling its end at an angle of 90° at a speed of 200 mm per minute. In the examination for weatherability, after treatment with a sunshine weather meter produced by Suga Testing Machine Co., Ltd. for 500 hours under the conditions of an atmospheric temperature of 43° C., a humidity of 50%, a black panel temperature of 63° C. and raining of 12 min/hr, measurement of adhesion strength and observation of the appearance of peeled surfaces and the whole film were carried out. In the examination for heat resistance, after heating at 80° C. for 24 hours, measurement of adhesion strength and observation of the appearance of peeled surfaces were carried out. The results are listed in Table 7.

TABLE 7

| | Examples | | Comparative Examples | | | | |
|---|---|---|---|---|---|---|---|
| | (2)5 | (2)6 | (2)6 | (2)7 | (2)8 | (2)9 | (2)10 |
| Initial adhesion strength (gf) | | | | | | | |
| Coating D | 200 | 260 | 205 | 320 | 200 | 130 | 410 |
| Coating E | 325 | 340 | 320 | 385 | 330 | 20 | 580 |
| Weatherability | | | | | | | |
| Adhesion strength | 390 | 420 | Note 1 | 485 | 520 | 250 | 680 |
| Peeled surface | 0 | 0 | Note 2 | Note 4 | Note 4 | 0 | Note 5 |
| Film | 0 | 0 | Note 3 | 0 | 0 | 0 | 0 |
| Heat resistance | | | | | | | |
| Adhesion strength | 350 | 380 | 360 | 450 | 345 | 220 | 220 |
| Peeled surface | 0 | 0 | 0 | Note 4 | 0 | 0 | Note 5 |

Note 1: Peeling and measurement could not be performed because film was broken.
Note 2: Peeling could not be performed because film was broken.
Note 3: Severe deterioration
Note 4: Considerable adhesive transfer
Note 5: Film left considerable prints of bubbles, creases or its edges.

In the table, 0 indicates a good state.

As apparent from Table 7, the coating protective films of Examples were superior to those of Comparative Examples in weatherability and heat resistance, so that these films exhibited good peelability and were well prevented from deterioration, adhesive transfer and printing of traces.

As described above, the coating protective film (2) of the present invention satisfies the requirements for weatherability of protective pressure sensitive adhesive film which is temporarily attached to finished automobiles for the purposes of protection of automotive coating during transfer and storage, and is also so excellent in peelability as not to pollute the coating on the automobiles. It causes no decrease in the peeling efficiency because its substrate is improved in weatherability by the use of a light-shielding film as its substrate and by the presence of ethylene units which excel propylene units in weatherability, while the decrease in weatherability due to the added colorants is prevented by the addition of a hindered-amine light stabilizer. Additives for automotive paint have no bad influences on coating because these additives are excellent in compatibility with resins and do not migrate into the pressure sensitive adhesive layer nor seeps to the surface of the substrate. Further, the pressure sensitive adhesive is made mainly of at least one of polyisobutylene, butyl rubber and polybutene which interact little with the coating, and do not adversely affect the properties of the coating. Such a constitution provides a coating protective film which does not leave prints of bubbles or transferred adhesive, which can function sufficiently as a protective pressure sensitive film for protecting the coating of Just-finished automobiles being transferred or kept, from ultraviolet, pollution and damages.

What is claimed is:

1. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and whose maximum percent transmission of ultraviolet within a wavelength range of 190 to 370 nm is not more than 5%, the pressure sensitive adhesive layer comprising as a main component a polymer selected from the group consisting of polyisobutylene, butyl rubber and polybutene; the polyolefin film being colored to white of not lower than N7 of the Munsell color system, and said polyolefin film containing an agent for improving weatherability which is a hindered-amine light stabilizer.

2. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and whose maximum percent transmission of ultraviolet within a wavelength range of 190 to 370 nm is not more than 5%, the pressure sensitive adhesive layer comprising as a main component a polymer selected from the group consisting of polyisobutylene, butyl rubber and polybutene; the polymer in the pressure sensitive adhesive being a rubber having a number average molecular weight of 150,000 to 600,000.

3. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and whose maximum percent transmission of ultraviolet within a wavelength of 190 to 370 nm is not more than 5%, the pressure sensitive adhesive layer comprising as a main component a polymer selected from the group consisting of polyisobutylene, butyl rubber and polybutene; the polymer in the pressure sensitive adhesive being a rubber having a number average molecular weight of 150,000 to 600,000 and the pressure sensitive adhesive further containing 1 to 20 parts by weight of a tackifier and 0.1 to 10 parts by weight of an agent for improving weatherability, both per 100 parts by weight of the rubber.

4. The coating protective film of claim 3, wherein the tackifier is a hydrogenated terpene-phenol resin, and the agent for improving weatherability is a benzotriazole UV absorber.

5. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and 0.1 to 10 parts by weight of a hindered-amine light stabilizer as an agent for improving weatherability per 100 parts by weight of the resin component, the colored polyolefin film having a maximum percent transmission of ultraviolet within a wavelength range of 190 to 370 nm of not more than 5% and being colored to white of not lower than N7 of the Munsell color system, the pressure sensitive adhesive layer comprising as a main component a polymer selected from the group consisting of polyisobutylene, butyl rubber and polybutene.

6. The coating protective film of claim 5, wherein the pressure sensitive adhesive contains 1 to 20 parts by weight of a tackifier and 0.1 to 10 parts by weight of an agent for improving weatherability, both per 100 parts by weight of the polymer.

7. The coating protective film of claim 6, wherein the tackifier in the pressure sensitive adhesive is a hydrogenated terpene-phenol resin, the agent for improving weatherability in the pressure sensitive adhesive is a benzotriazole UV absorber, and the polymer in the pressure sensitive adhesive is polyisobutylene.

8. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and 0.1 to 10 parts by weight of an agent for improving weatherability per 100 parts by weight of the resin component and whose maximum percent transmission of ultraviolet with in a wavelength range of 190 to 370 nm is not more than 5%, the pressure sensitive adhesive layer comprising as a main component a polymer selected from the group consisting of polyisobutylene, butyl rubber and polybutene, the polymer in the pressure sensitive adhesive being a rubber having a number average molecular weight of 150,000 to 600,000.

9. A coating protective film comprising a substrate and a pressure sensitive adhesive layer on the substrate, the substrate being made of a colored polyolefin film which comprises a resin component comprising 5 to 40% by weight of ethylene units and 60 to 95% by weight of propylene units and 0.1 to 10 parts by weight of an agent for improving weatherability per 100 parts by weight of the resin component and whose maximum percent transmission of ultraviolet with in a wavelength range of 190 to 370 nm is not more than 5%, the pressure sensitive adhesive layer comprising as a main component a polymer selected from the group consisting of polyisobutylene, butyl rubber and polybutene, the polymer in the pressure sensitive adhesive being a rubber having a number average molecular weight of 150,000 to 600,000 and the pressure sensitive adhesive further containing 1 to 20 parts by weight of a tackifier and 0.1 to 10 parts by weight of an agent for improving weatherability, both per 100 parts by weight of the rubber.

10. The coating protective film of claim 9, wherein the tackifier is a hydrogenated terpene-phenol resin, and the agent for improving weatherability in the pressure sensitive adhesive is a benzotriazole UV absorber.

11. The coating protective film of claim 8, wherein the polyolefin film is colored to white of not lower than N7 of the Munsell color system, and the agent for improving weather-ability in the polyolefin film is a hindered-amine light stabilizer.

12. The coating protective film of claim 11, wherein the polymer in the pressure sensitive adhesive is polyisobutylene.

13. The coating protective film of claim 9, wherein the polyolefin film is colored to white of not lower than N7 of the Munsell color system, the agent for improving the weather-ability contained in the polyolefin is a hindered-amine stabilizer, and the polymer in the pressure sensitive adhesive is polyisobutylene.

* * * * *